United States Patent
Huang et al.

(10) Patent No.: US 11,290,940 B2
(45) Date of Patent: Mar. 29, 2022

(54) NETWORK PATH SELECTION METHOD AND NETWORK NODE DEVICE USING THE SAME

(71) Applicant: Arcadyan Technology Corporation, Hsinchu (TW)

(72) Inventors: Kuo-Shu Huang, Hsinchu (TW); Wen-Chieh Wang, Hsinchu (TW); Wei-Ru Tseng, Hsinchu (TW); Wei-Yang Teng, Hsinchu (TW)

(73) Assignee: Arcadyan Technology Corporation

( * ) Notice: Subject to any disclaimer, the term of this patent is extended or adjusted under 35 U.S.C. 154(b) by 5 days.

(21) Appl. No.: 16/937,339

(22) Filed: Jul. 23, 2020

(65) Prior Publication Data
US 2021/0160758 A1   May 27, 2021

(30) Foreign Application Priority Data
Nov. 26, 2019 (TW) .................. 108142894

(51) Int. Cl.
*H04W 40/12* (2009.01)
*H04L 45/021* (2022.01)
(Continued)

(52) U.S. Cl.
CPC .......... *H04W 40/12* (2013.01); *H04L 45/021* (2013.01); *H04L 45/121* (2013.01); *H04L 45/16* (2013.01);
(Continued)

(58) Field of Classification Search
CPC ..... H04W 40/12; H04W 24/08; H04W 40/08; H04W 40/22; H04W 24/02; H04W 40/28;
(Continued)

(56) References Cited

U.S. PATENT DOCUMENTS

| 7,986,617 | B2* | 7/2011 | Knepley, Jr | H04L 45/126 370/216 |
| 8,335,163 | B2* | 12/2012 | Li | H04L 43/10 370/248 |

(Continued)

FOREIGN PATENT DOCUMENTS

TW    I643520 B    12/2018

OTHER PUBLICATIONS

Communication from European Patent Office for European Application No. 20207225.2, dated Apr. 22, 2021, 8 pages.

*Primary Examiner* — Man U Phan
(74) *Attorney, Agent, or Firm* — Innovation Counsel LLP

(57) ABSTRACT

A network path selection method and a network node device using the same are disclosed. The network path selection method includes: determining whether a first uplink time parameter table is received from the first relay node device and whether a second uplink time parameter table is received from the second relay node device; when the first uplink time parameter table is received from the first relay node device and the second uplink time parameter table is received from the second relay node device, calculating a first estimated uplink time parameter according to the first uplink time parameter table and a second estimated uplink time parameter according to the second uplink time parameter table; and determining to connect to a gateway via one of the first relay node device and the second relay node device according to the first estimated uplink time parameter and the second estimated uplink time parameter.

14 Claims, 6 Drawing Sheets

(51) Int. Cl.
  *H04L 45/121* (2022.01)
  *H04L 45/16* (2022.01)
  *H04W 40/24* (2009.01)
  *H04W 40/28* (2009.01)
  *H04W 88/16* (2009.01)

(52) U.S. Cl.
  CPC ....... *H04W 40/242* (2013.01); *H04W 40/248* (2013.01); *H04W 40/28* (2013.01); *H04W 88/16* (2013.01)

(58) Field of Classification Search
  CPC . H04W 40/242; H04W 40/248; H04W 88/16; H04W 40/24; H04L 45/122; H04L 45/127; H04L 12/66; H04L 45/021; H04L 45/22; H04L 45/121; H04L 45/16; H04L 45/70; H04L 12/755; H04L 12/727; H04L 12/761
  USPC .................................................. 370/252, 329
  See application file for complete search history.

(56) References Cited

U.S. PATENT DOCUMENTS

| | | | |
|---|---|---|---|
| 8,885,520 B2* | 11/2014 | Zhang | H04L 41/0856 |
| | | | 370/256 |
| 9,066,287 B2* | 6/2015 | Merlin | H04W 40/12 |
| 9,686,189 B2* | 6/2017 | Keskkula | H04L 45/70 |
| 9,729,428 B2* | 8/2017 | Wang | H04L 67/025 |
| 9,942,944 B2* | 4/2018 | Phuyal | H04L 1/08 |
| 10,454,583 B2* | 10/2019 | Mehrvar | H04J 14/0267 |
| 10,484,247 B2* | 11/2019 | Bergstrom | H04L 45/123 |
| 2008/0084856 A1* | 4/2008 | Ramachandran | H04W 40/22 |
| | | | 370/342 |
| 2008/0107075 A1* | 5/2008 | Ramachandran | H04W 40/246 |
| | | | 370/331 |
| 2013/0136019 A1* | 5/2013 | Fujimoto | H04W 24/02 |
| | | | 370/252 |
| 2014/0177460 A1 | 6/2014 | Keskkula et al. | |
| 2015/0237122 A1 | 8/2015 | Wang et al. | |
| 2019/0208433 A1* | 7/2019 | Hsieh | H04W 40/12 |

\* cited by examiner

NETWORK PATH SELECTION METHOD AND NETWORK NODE DEVICE USING THE SAME

This application claims the benefit of Taiwan application Serial No. 108142894, filed Nov. 26, 2019, the subject matter of which is incorporated herein by reference.

BACKGROUND OF THE INVENTION

Field of the Invention

The invention relates in general to a network path selection method and a network node device using the same.

Description of the Related Art

Along with the development of network technology, various networking technologies are provided one after another. For example, network can be connected using a wired ethernet technology, a wireless network technology (Wi-Fi), a power line communication (PLC) technology, or a multimedia over coax alliance (MoCA) technology which adopts coaxial cable. Different networking technologies have different applicable environments and transmission efficiencies. Therefore, a mesh network architecture which combines various networking technologies is provided.

However, the mesh network architecture is extremely complicated, and it is not an easy job for a user to select a best networking. Therefore, it has become a prominent task for the industries to provide a method for automatically selecting the best networking.

SUMMARY OF THE INVENTION

According to one embodiment of the present invention, a network node device is provided. The network node device includes a communication unit and a processing unit. The communication unit is configured to connect to a gateway via one of a first relay node device and a second relay node device. The processing unit is configured to: determine whether a first uplink time parameter table is received from the first relay node device and whether a second uplink time parameter table is received from the second relay node device; when the first uplink time parameter table is received from the first relay node device and the second uplink time parameter table is received from the second relay node device, calculate a first estimated uplink time parameter according to the first uplink time parameter table and a second estimated uplink time parameter according to the second uplink time parameter table; and determine to connect to a gateway via one of the first relay node device and the second relay node device according to the first estimated uplink time parameter and the second estimated uplink time parameter.

According to another embodiment of the present invention, a network path selection method is provided. The network path selection method includes: determining whether a first uplink time parameter table is received from the first relay node device and whether a second uplink time parameter table is received from the second relay node device; when the first uplink time parameter table is received from the first relay node device and the second uplink time parameter table is received from the second relay node device, calculating a first estimated uplink time parameter according to the first uplink time parameter table and a second estimated uplink time parameter according to the second uplink time parameter table; and determining to connect to a gateway via one of the first relay node device and the second relay node device according to the first estimated uplink time parameter and the second estimated uplink time parameter.

The above and other aspects of the invention will become better understood with regard to the following detailed description of the preferred but non-limiting embodiment (s). The following description is made with reference to the accompanying drawings.

DETAILED DESCRIPTION OF THE INVENTION

Different networking technologies, such as wired ethernet technology, wireless network technology (Wi-Fi), and power line communication (PLC) technology can be used in a mesh network, and it is not an easy job for a user to select a best networking. A number of embodiments for automatically selecting the best networking are disclosed below.

Figure 1:
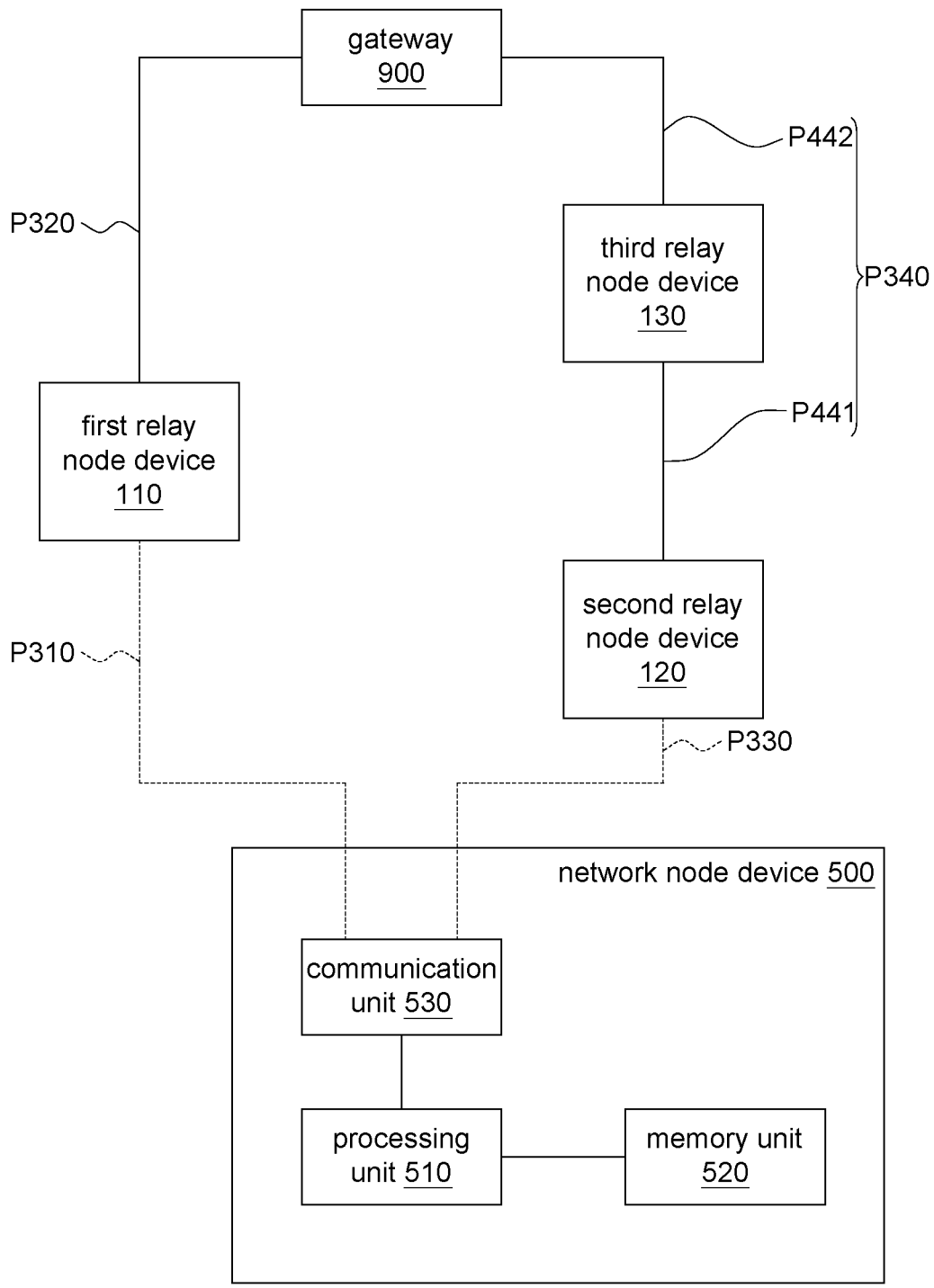
FIG. 1 is a schematic diagram of a mesh network according to an embodiment.
Figure 2A:
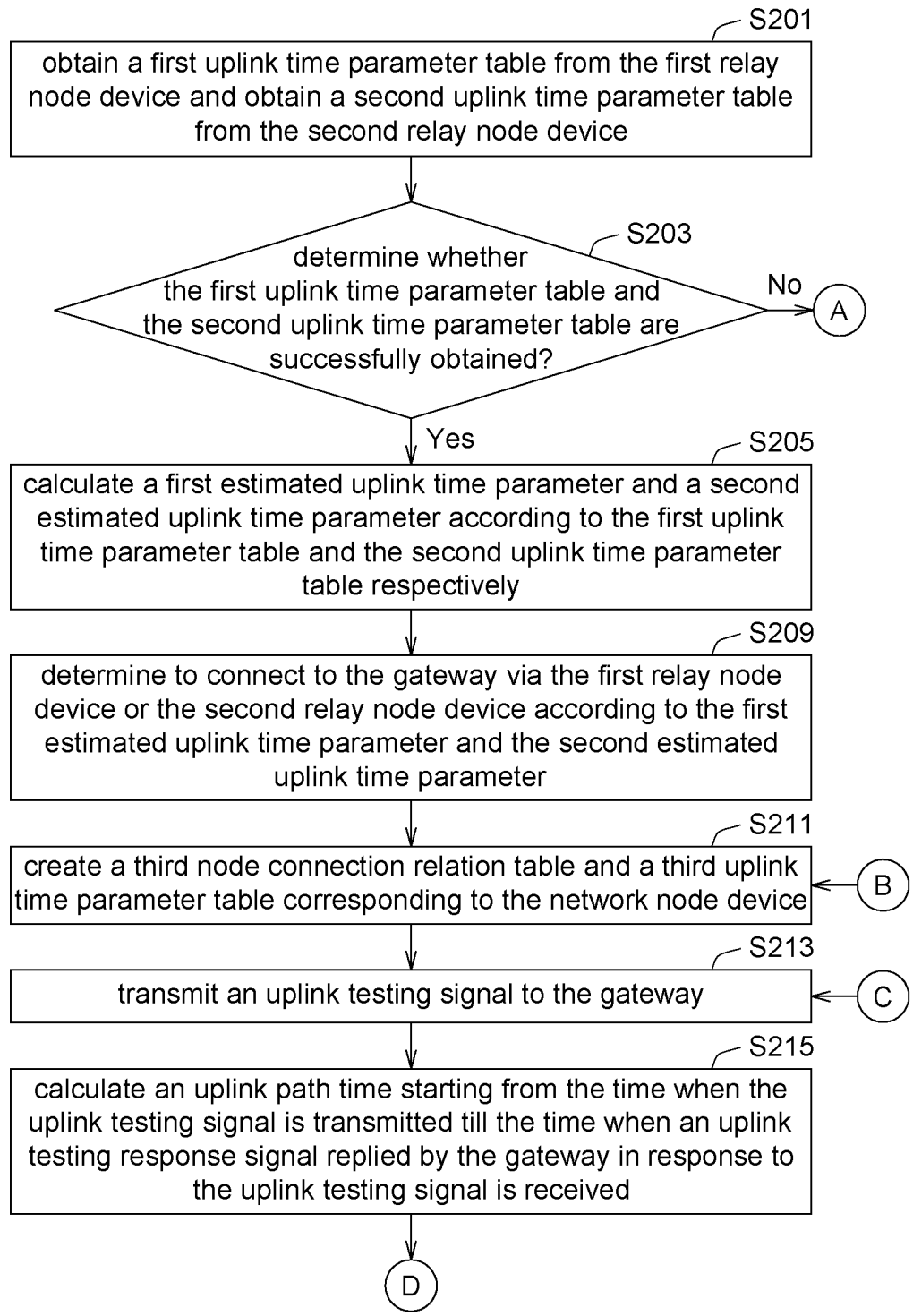
FIGS. 2A-2E are flowcharts of a network path selection method according to an embodiment.
Figure 2B:
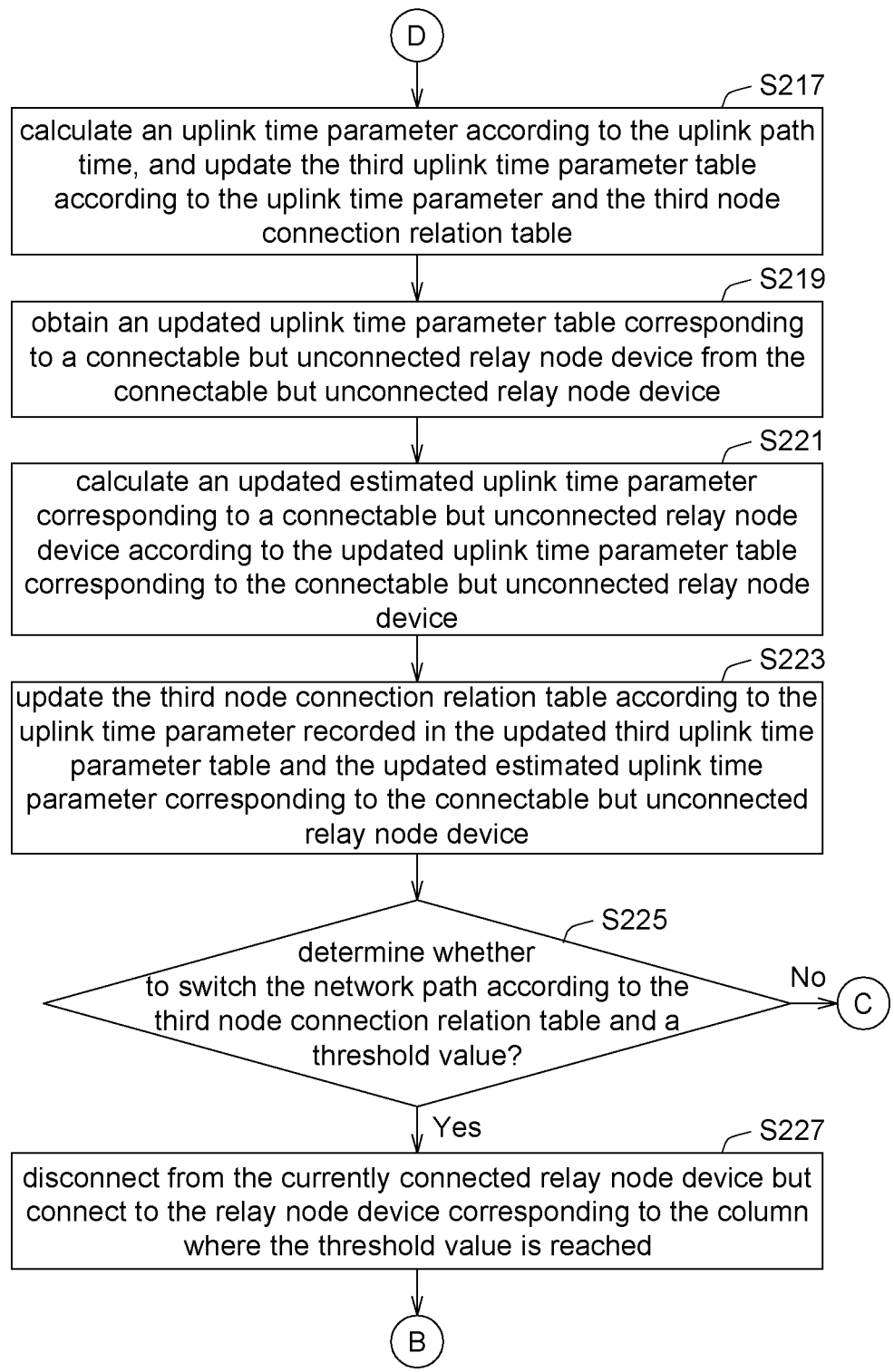
Figure 2C:
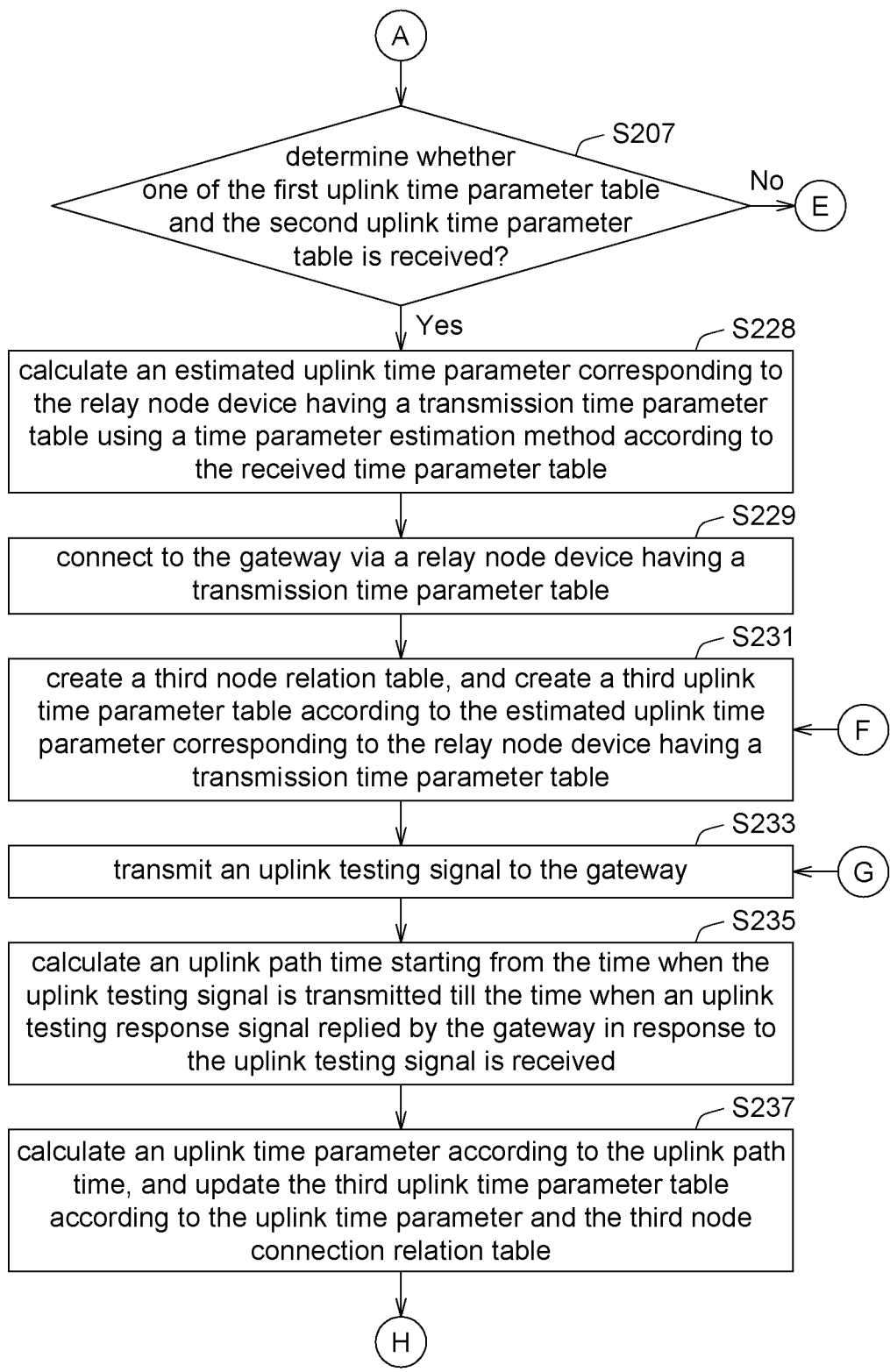
Figure 2D:
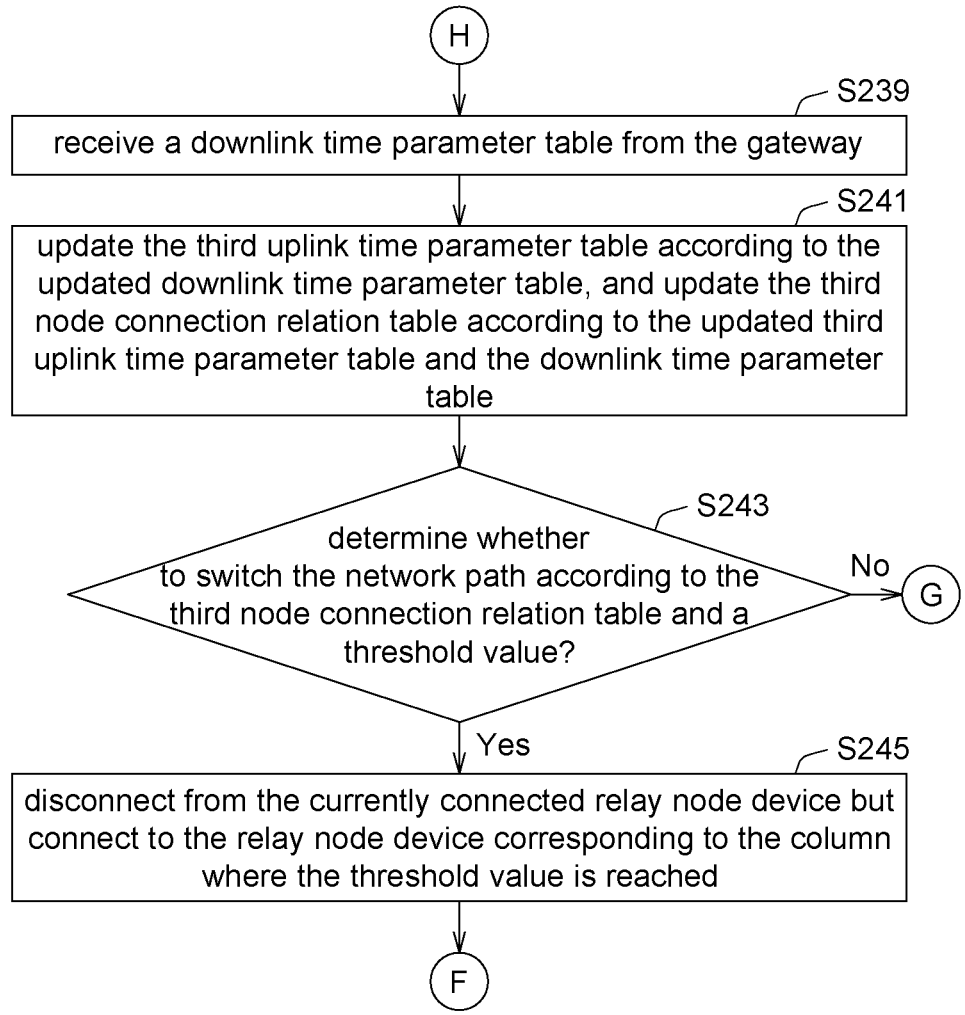
Figure 2E:
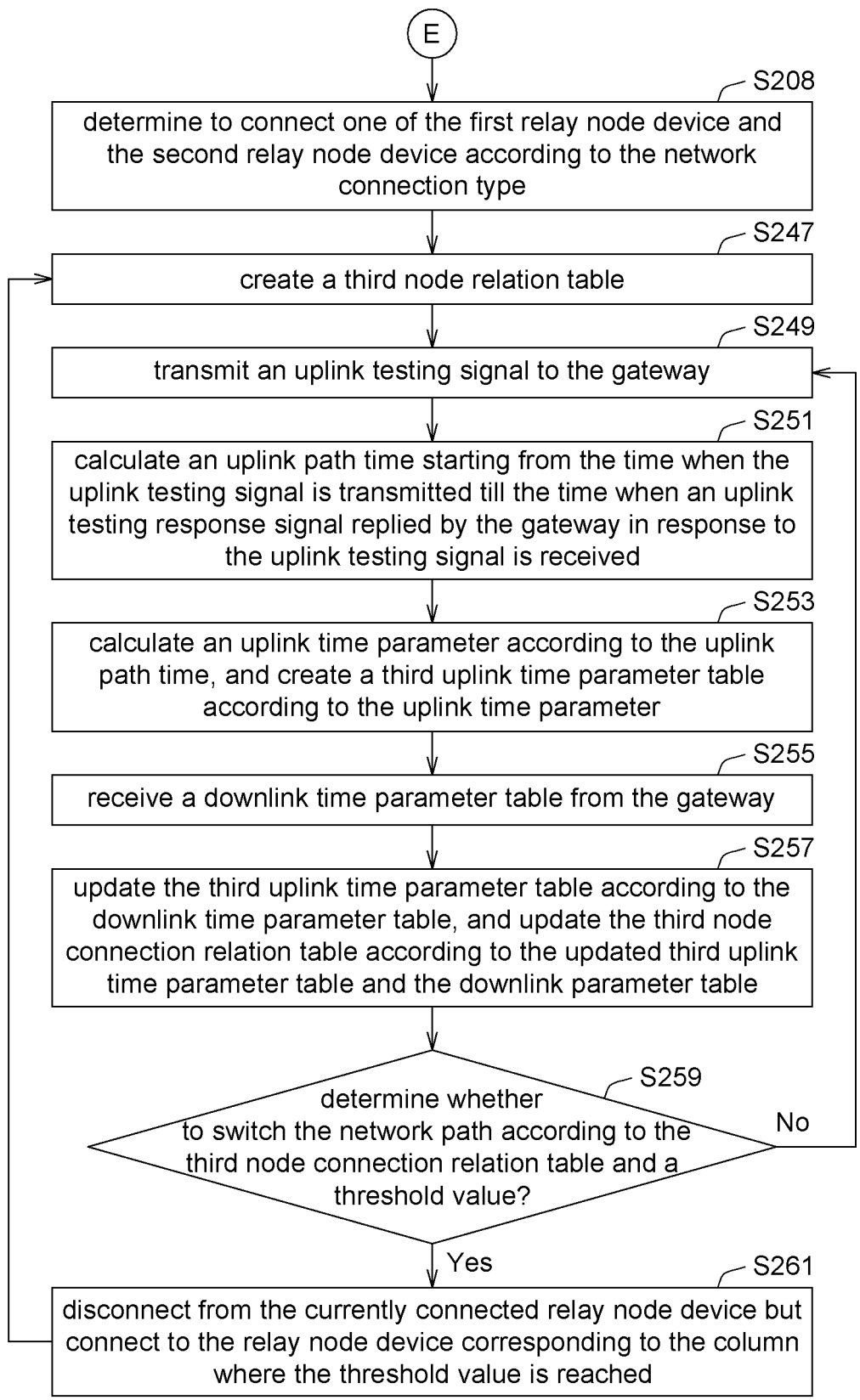

Referring to FIG. 1, a schematic diagram of a mesh network according to an embodiment is shown. In the mesh network 1000, the nodes can be connected using a wired ethernet technology, a wireless network technology, or a power line network technology. As indicated in FIG. 1, the mesh network 1000 includes a network node device 500, a first relay node device 110, a second relay node device 120, a third relay node device 130 and a gateway 900.

The network node device 500 includes a processing unit 510, a memory unit 520 and a communication unit 530. The processing unit 510 is configured to perform various procedures of processing, operation and judgement. The processing unit can be realized by a chip or a circuit. The memory unit 520 can be coupled to the processing unit 510 to store various data, tables, firmware and programming codes. The memory unit 520 can be realized by a non-volatile memory or a combination of non-volatile memory and volatile memory. The communication unit 530 can be coupled to the processing unit 510 to transmit a signal and/or data to the mesh network 1000 and to receive a signal and/or data from the mesh network 1000. The communication unit 530 can be realized by a combination of communication specific chip/circuit and network interface.

The network node device 500 can connect to the gateway 900 via the first relay node device 110 or the second relay node device 120. A first transmission path P310 connects the network node device 500 and the first relay node device 110; a second transmission path P320 connects the first relay node device 110 and the gateway 900; a third transmission path P330 connects the network node device 500 and the second relay node device 120; a fourth transmission path P340 connects the second relay node device 120 and the gateway 900. The fourth transmission path P340 includes a first section path P441 and a second section path P442. The first section path P441 connects the second relay node device 120 and the third relay node device 130; the second section path P442 connects the third relay node device 130 and the gateway 900.

Referring to FIGS. 2A-2E, flowcharts of a network path selection method according to an embodiment are shown.

The network path selection method can be realized in the form of computer readable instructions, and can be performed by the processing unit of the network node device 500. To simplify the descriptions of the network path selection method, a first embodiment is exemplified below. In the first embodiment, the first relay node device 110, the second relay node device 120, the third relay node device 130 and the gateway 900 all equipped with corresponding function for supporting the network path selection method; the first relay node device 110 uses a wireless network technology (such as Wi-Fi); the second relay node device 120 uses a wired ethernet technology.

For the first relay node device 110, the second relay node device 120 and the third relay node device 130, the corresponding function for supporting the network path selection method includes periodically performing the following operations of: (1) transmitting an uplink testing signal to the gateway 900; (2) measuring an uplink path time from the time when the uplink testing signal is transmitted till the time when an uplink testing response signal replied by the gateway 900 in response to the uplink testing signal is received; and (3) calculating an uplink time parameter according to the measured uplink path time and creating/updating an uplink time parameter table according to the uplink time parameter and a node connection relation table, which records the connection relation between the mesh network 1000 and other node devices. Table 1 is a node connection relation table of the first relay node device 110; Table 2 is an uplink time parameter table of the first relay node device 110.

For the gateway 900, the corresponding function for supporting the network path selection method includes periodically performing the following operations of: (1) transmitting a downlink testing signal to all node devices of the mesh network 1000; (2) respectively measuring a downlink path time from the time when the downlink testing signal is transmitted till the time when a downlink testing response signal replied by each of the node devices in response to the downlink testing signal is received; and (3) calculating a plurality of downlink time parameters according to the measured downlink path time and creating/updating a downlink time parameter table according to the downlink time parameters and a node connection relation master table, which records the connection relation between all node devices of the mesh network 1000.

Table 1 is a node connection relation table of the first relay node device 110; Table 2 is an uplink time parameter table of the first relay node device 110.

Table 3 is a node connection relation table of the second relay node device 120; Table 4 is an uplink time parameter table of the second relay node device 120.

Table 5 is a node connection relation table of the third relay node device 130; Table 3 is an uplink time parameter table of the third relay node device 130.

Table 7 is a node connection master table of the gateway 900; Table 8 is a downlink time parameter table of the gateway 900.

TABLE 1

|  | Gateway 900 | First relay node device 110 | Second relay node device 120 | Third relay node device 130 |
|---|---|---|---|---|
| First relay node device 110 | X | 0 | 0 | 0 |

TABLE 2

|  | Gateway 900 | First relay node device 110 | Second relay node device 120 | Third relay node device 130 |
|---|---|---|---|---|
| First relay node device 110 | URM1 | 0 | 0 | 0 |

TABLE 3

|  | Gateway 900 | First relay node device 110 | Second relay node device 120 | Third relay node device 130 |
|---|---|---|---|---|
| Second relay node device 120 | 0 | 0 | 0 | X |

TABLE 4

|  | Gateway 900 | First relay node device 110 | Second relay node device 120 | Third relay node device 130 |
|---|---|---|---|---|
| Second relay node device 120 | 0 | 0 | 0 | URM2 |

TABLE 5

|  | Gateway 900 | First relay node device 110 | Second relay node device 120 | Third relay node device 130 |
|---|---|---|---|---|
| Third relay node device 130 | X | 0 | 0 | 0 |

TABLE 6

|  | Gateway 900 | First relay node device 110 | Second relay node device 120 | Third relay node device 130 |
|---|---|---|---|---|
| Third relay node device 130 | URM3 | 0 | 0 | 0 |

TABLE 7

| Previous stage | Gateway 900 | First relay node device 110 | Second relay node device 120 | Third relay node device 130 |
|---|---|---|---|---|
| Gateway 900 | 0 | 0 | 0 | 0 |
| First relay node device 110 | X | 0 | 0 | 0 |
| Second relay node device 120 | 0 | 0 | 0 | X |
| Third relay node device 130 | X | 0 | 0 | 0 |

TABLE 8

| Previous stage | Gateway 900 | First relay node device 110 | Second relay node device 120 | Third relay node device 130 |
|---|---|---|---|---|
| Gateway 900 | 0 | 0 | 0 | 0 |
| First relay node device 110 | Drm1 | 0 | 0 | 0 |
| Second relay node device 120 | 0 | 0 | 0 | Drm2 |
| Third relay node device 130 | Drm3 | 0 | 0 | 0 |

Wherein, 0 indicates no connection; X is an integer greater than 1 and indicates that two devices are connected; detailed descriptions are disclosed below. URM1, URM2 and URM3 are uplink time parameters measured by the first relay node device 110, the second relay node device 120 and the third relay node device 130 respectively. DRM1, DRM2 and DRM3 are downlink time parameters measured by the gateway 900 and correspond to the first relay node device 110, the second relay node device 120 and the third relay node device 130 respectively.

Refer to FIGS. 2A-2E after the environment of the mesh network 1000 of the first embodiment is understood. The network node device 500 selects one of the first relay node device 110 and the second relay node device 130 using the network path selection method and connects to the gateway 900 via the selected one of the first relay node device 110 and the second relay node device 130.

In step S201, an attempt to obtain a first uplink time parameter table from the first relay node device 110 and obtain a second uplink time parameter table from the second relay node device 120 is made by the communication unit 530 of the network node device 500. The first uplink time parameter table is a time parameter table, such as Table 2, created by the first relay node device 110. The second uplink time parameter table is a time parameter table, such as Table 4, created by the second relay node device 120.

In step S203, whether the first uplink time parameter table and the second uplink time parameter table are successfully obtained from the first relay node device 110 and the second relay node device 120 respectively is determined by the processing unit 510 of the network node device 500. If yes (that is, both the first parameter table and the second parameter table are obtained), the method proceeds to step S205. If no (that is, none of the first parameter table and the second parameter table is obtained), the method proceeds to step S207. In the first embodiment, both the first relay node device 110 and the second relay node device 120 are equipped with the function for creating a time parameter table. Under normal circumstances, the network node device 500 can obtain the first uplink time parameter table and the second uplink time parameter table and therefore proceed to the "Y" branch (that is, step S205). Details of the "N" branch (that is, step S207 and subsequent steps) will be disclosed in another embodiment.

In step S205, a first estimated uplink time parameter corresponding to the first relay node device 110 is calculated by the processing unit 510 of the network node device 500 using a wireless network time parameter estimation method according to the first uplink time parameter table, and a second estimated uplink time parameter corresponding to the second relay node device 120 is calculated using a wired network time parameter estimation method according to the second uplink time parameter table. The first estimated uplink time parameter is an estimate of an uplink time parameter for connecting the network node device 500 to the gateway 900 via the first relay node device 110. The second estimated uplink time parameter is an estimate of an uplink time parameter for connecting the network node device 500 to the gateway 900 via the second relay node device 120.

The time estimation parameter is calculated using a wireless network parameter estimation method according to the following formula:

$$URM\_est1 = URM\_up + (Data\_sz/(Data\_rt*MIMO*BW\_w*CH\_ut/CH\_w))*2$$

Wherein, URM_est1 represents an estimated uplink time parameter; URM_up represents an uplink time parameter of a previous stage relay node device; Data_sz represents a size of an uplink testing signal; Data_rt represents a data transmission rate of a previous stage relay node device; MIMO represents an antenna quantity of a previous stage relay node device (when the antenna quantity is 1, MIMO=1; when the antenna quantity is 2, MIMO=2; when the antenna quantity is 4, MIMO=4; and the rest can be obtained by the same analogy); BW_w represents a bandwidth weight provided to the network node device 500 by a previous stage relay node device (for example, suppose the reference level is bandwidth 20 MHz; when the bandwidth is 20 MHz, CH_w=1; when the bandwidth is 40 MHz, CH_=2; and the rest can be obtained by the same analogy); CH_ut represents a ratio of remaining usable channels of the previous stage relay node device (that is, the bandwidth of the remaining usable channels to the bandwidth of all usable channels); CH_w represents a parameter indicating whether the channels for uplink transmission and the channels for downlink transmission are the same in the previous stage relay node device use (if the channels for uplink transmission and the channels for downlink transmission are the same, CH_w=2; otherwise, CH_w=1).

When the first estimated uplink time parameter is calculated according to the above formula, a first uplink time parameter T1 corresponding to the first relay node device 110 is obtained from the first uplink time parameter table and substitutes for URM_up. In the present embodiment, Data_sz represents a 32-byte parameter. The network node device 500 detects a received signal strength indication (RSSI) of the first relay node device 110 and obtains a data transmission rate (Data_rt) of the first relay node device 110 according to the RSSI. Current technologies provide various methods for converting RSSI to data transmission rate. The network node device 500 can obtain the information of MIMO, BW_w, CH_ut and CH_w from a beacon transmitted by the first relay node device 110. The URM_est1 obtained by substituting the obtained parameters into the above formula by the processing unit 510 is the first estimated uplink time parameter for connecting the network node device 500 to the gateway 900 via the first relay node device 110.

The time estimation parameter is calculated using a wired network parameter estimation method according to the following formula:

$$URM\_est2 = URM\_up + (Data\_sz/Data\_rt)*2$$

Wherein, URM_est2 represents an estimated uplink time parameter; URM_up represents an uplink time parameter of a previous stage relay node device; Data_sz represents a size of an uplink testing signal; Data_rt represents a data transmission rate of a previous stage relay node device. When the first estimated uplink time parameter is calculated according to the above formula, a second uplink time parameter T1 corresponding to the second relay node device 120 is obtained from the first uplink time parameter table and substitutes for URM_up. In the present embodiment, Data_sz represents a 32-byte parameter. The network node device 500 can directly measure the data transmission rate of the second relay node device 120. The URM_est2 obtained by substituting the obtained parameters into the above formula by the processing unit 510 is the second estimated uplink time parameter for connecting the network node device 500 to the gateway 900 via the second relay node device 120.

In step S209, determine to connect to the gateway 900 via the first relay node device 110 or the second relay node device 120 by the processing unit 510 of the network node device 500 according to the first estimated uplink time parameter and the second estimated uplink time parameter. When the first estimated uplink time parameter is less than the second estimated uplink time parameter, the processing unit 510 determines to connect to the gateway 900 via the first relay node device 110. When the first estimated uplink time parameter is not less than the second estimated uplink time parameter, the processing unit 510 determines to connect to the gateway 900 via the second relay node device 120. For the convenience of describing subsequent steps, it is assumed that the processing unit 510 determines to connect to the gateway 900 via the first relay node device 110. That is, the first transmission path P310 is created between the network node device 500 and the first relay node device 110, but no third transmission path P330 is created between the network node device 500 and the second relay node device 120.

It should be noted that the above exemplification is for exemplary purpose only. In practical application, the network node device 500 determines the corresponding time parameter estimation method according to the type of the relay node device.

In step S211, a third node connection relation table and a third uplink time parameter table corresponding to the network node device 500 are created by the processing unit 510 of the network node device 500. Table 9 is the third node connection relation table of the network node device 500. Table 10 is the third uplink time parameter table of the network node device 500.

TABLE 9

|  | Gateway 900 | First relay node device 110 | Second relay node device 120 | Third relay node device 130 | Network node device 500 |
| --- | --- | --- | --- | --- | --- |
| Network node device 500 | 0 | X | 1 | 0 | 0 |

TABLE 10

|  | Gateway 900 | First relay node device 110 | Second relay node device 120 | Third relay node device 130 | Network node device 500 |
| --- | --- | --- | --- | --- | --- |
| Network node device 500 | 0 | T4 | 0 | 0 | 0 |

In Table 9, when X is an integer greater than 1, this indicates that two devices are connected; when X is 1, this indicates that two devices are connectable but are not connected. In Table 10, T4 represents a first estimated uplink time parameter.

When a mesh network 1000 is added to the network node device 500, the gateway 900 updates its node connection relation master table. The updated node connection relation master table is illustrated in Table 11.

TABLE 11

| Previous stage | Gateway 900 | First relay node device 110 | Second relay node device 120 | Third relay node device 130 | Network node device 500 |
| --- | --- | --- | --- | --- | --- |
| Gateway 900 | 0 | 0 | 0 | 0 | 0 |
| First relay node device 110 | X | 0 | 0 | 0 | 0 |
| Second relay node device 120 | 0 | 0 | 0 | X | 0 |
| Third relay node device 130 | X | 0 | 0 | 0 | 0 |
| Network node device 500 | 0 | X | 0 | 0 | 0 |

Besides, as indicated in Table 12, when the gateway 900 updates the downlink time parameter table, a column for the network node device 500 is added to Table 11.

TABLE 12

| Previous stage | Gateway 900 | First relay node device 110 | Second relay node device 120 | Third relay node device 130 | Network node device 500 |
| --- | --- | --- | --- | --- | --- |
| Gateway 900 | 0 | 0 | 0 | 0 | 0 |
| First relay node device 110 | Drm1 | 0 | 0 | 0 | 0 |
| Second relay node device 120 | 0 | 0 | 0 | Drm2 | 0 |
| Third relay node device 130 | Drm3 | 0 | 0 | 0 | 0 |
| Network node device 500 | 0 | Drm4 | 0 | 0 | 0 |

Wherein, DRM4 represents a downlink time parameter corresponding to the network node device 500 measured by the gateway 900.

In step S213, an uplink testing signal is transmitted to the gateway 900 by the communication unit 530 of the network node device 500.

In step S215, an uplink path time from the time when the uplink testing signal is transmitted till the time when an uplink testing response signal replied by the gateway 900 in response to the uplink testing signal is received is calculated by the processing unit 510 of the network node device 500.

In step S217, an uplink time parameter is calculated by the processing unit 510 of the network node device 500 according to the uplink path time, and the third uplink time parameter table is updated by the same according to the uplink time parameter and the third node connection relation table. In an embodiment, the processing unit 510 sets the uplink path time as an uplink time parameter without considering historical uplink time parameters. In another embodiment, the processing unit 510 multiplies the most recently measured uplink path time by a first weight and multiplies the uplink time parameter recorded in the current third uplink time parameter table by a second weight, and then adds the two weighted parameters to obtain an updated uplink time parameter. The calculation of the updated uplink time parameter can be expressed as:

$$URM\_new = RTT*w1 + URM\_current*w2$$

Wherein, URM_new represents an updated uplink time parameter; RTT represents an uplink path time; URM_current represents an uplink time parameter recorded in the current third uplink time parameter table; w1 represents a first weight; w2 represents a second weight; both w1 and w2 are a real number greater than 0 and less than 1, and w1+w2=1.

In step S219, an updated uplink time parameter table (the updated second uplink time parameter table in the present embodiment) corresponding to a connectable but unconnected relay node device (the second relay node device 120 in the present embodiment) is obtained by the communication unit 530 of the network node device 500.

In step S221, an updated estimated uplink time parameter (the updated second estimated uplink time parameter in the present embodiment) corresponding to a connectable but unconnected relay node device is calculated by the communication unit 530 of the network node device 500 according to the updated uplink time parameter table (the updated second uplink time parameter table in the present embodiment) corresponding to the connectable but unconnected relay node device.

In step S223, the third node connection relation table is updated by the communication unit 530 of the network node device 500 according to the uplink time parameter recorded in the updated third uplink time parameter table and the updated estimated uplink time parameter corresponding to the connectable but unconnected relay node device (the updated second estimated uplink time parameter in the present embodiment). In the present embodiment, when the updated second estimated uplink time parameter is greater than the uplink time parameter recorded in the updated third uplink time parameter table, the processing unit 510 adds the value of the column in the third node connection relation table corresponding to the second relay node device 120 by 1 (in Table 9, the value is increased to 2 from 1). Conversely, when the updated second estimated uplink time parameter is not greater than the uplink time parameter recorded in the updated third uplink time parameter table, the value of the column is decreased by 1, but the minimum value is 1.

In step S225, whether to switch the network path is determined by the processing unit 510 of the network node device 500 according to the third node connection relation table and a threshold value. If the determination is positive, the method proceeds to step S227, the network node device 500 is disconnected from the currently connected relay node device but is connected to the relay node device corresponding to the column where the threshold value is reached, the value of the column in the third node connection relation table corresponding to the disconnected relay node device is reset, and the method proceeds to step S211. If the determination is negative, the method proceeds to step S213. Practical operations are exemplified in the present embodiment. When the value of the column in the third node connection relation table corresponding to the second relay node device 120 reaches X (the threshold value), the processing unit 510 disconnects from the first relay node device 110, sets the value of the column in the third node connection relation table corresponding to the first relay node device as 1, connects to the second relay node device 120, and further connects to the gateway 900 via the second relay node device 120. In other words, steps S213-S215 are periodically performed to check whether better connection is available. The design of a threshold value avoids the connection being frequently switched and causing extra load to the network node device 500.

Descriptions of a second embodiment are disclosed below. In the second embodiment, the second relay node device 120 is not equipped with corresponding function for supporting the network path selection method. That is, the determination in step S203 is negative and the method proceeds to step S207.

In step S207, whether one of the first uplink time parameter table and the second uplink time parameter table is received is determined by the processing unit 510 of the network node device 500. If yes, the method proceeds to step S228; if no, the method proceeds to step S208.

In step S228, an estimated uplink time parameter (the first estimated uplink time parameter in the present embodiment) corresponding to the relay node device having a transmission time parameter table (the first relay node device 110 in the present embodiment) is calculated by the processing unit 510 of the network node device 500 using a time parameter estimation method (the wireless network time parameter estimation method in the present embodiment) according to the received time parameter table (the first uplink time parameter table in the present embodiment).

In step S229, the network node device 500 is connected to the gateway 900 by the processing unit 510 via a relay node device having a transmission time parameter table (the first relay node device 110 in the present embodiment).

In step S231, a third node relation table is created by the processing unit 510 of the network node device 500, and a third uplink time parameter table is created according to an estimated uplink time parameter (the first estimated uplink time parameter in the present embodiment) corresponding to the relay node device having a transmission time parameter table (the first relay node device 110 in the present embodiment). Descriptions of the created third node connection relation table and the third uplink time parameter table can be made with reference to Table 9 and Table 10.

It should be noted that in some embodiments, steps S228 and S231 can selectively be omitted.

In step S233, an uplink testing signal is transmitted to the gateway 900 by the communication unit 530 of the network node device 500.

In step S235, an uplink path time from the time when the uplink testing signal is transmitted till the time when an uplink testing response signal replied by the gateway 900 in response to the uplink testing signal is received is calculated by the processing unit 510 of the network node device 500.

In step S237, an uplink time parameter is calculated by the processing unit 510 of the network node device 500 according to the uplink path time, and the third uplink time parameter table is updated by the same according to the uplink time parameter and the third node connection relation table. If steps S228 and S231 are not performed, step S237 changes to create the third uplink time parameter table.

In step S239, a downlink time parameter table is received from the gateway 900 by the communication unit 530 of the network node device 500. The communication unit 530 of the network node device 500 transmits a request signal to request the gateway 900 to provide the downlink time parameter table in response to the request signal.

In step S241, the third uplink time parameter table is updated by the processing unit 510 of the network node device 500 according to the updated downlink time parameter table. In the present embodiment, the processing unit 510 uses an average value of the downlink time parameter of the downlink time parameter table corresponding to the network node device 500 and the uplink time parameter of the third uplink time parameter table as an updated uplink time parameter, and records the average value to the third uplink time parameter table.

In step S241, the third node connection relation table is updated by the processing unit 510 of the network node device 500 according to the downlink time parameter corresponding to the relay node device (the second relay node device 120 in the present embodiment), which is connectable but is unconnected and does not provide the uplink time parameter table, among the updated third uplink time parameter table and the downlink time parameter table. In the present embodiment, the processing unit 510 compares the downlink time parameter of the downlink time parameter table corresponding to the second relay node device 120 with the updated uplink time parameter of step S239. If the downlink time parameter corresponding to the second relay node device 120 is greater than the updated uplink time parameter, the value of the column in the third node connection relation table corresponding to the second relay node device 120 is added by 1. If the downlink time parameter corresponding to the second relay node device 120 is not greater than the updated uplink time parameter, the value of the said column remains unchanged.

In step S243, whether to switch the network path is determined by the processing unit 510 of the network node device 500 according to the third node connection relation table and a threshold value. If the determination is positive, the method proceeds to step S245, the network node device 500 is disconnected from the currently connected relay node device but is connected to the relay node device corresponding to the column where the threshold value is reached, and the value of the column in the third node connection relation table corresponding to the disconnected relay node device is reset. If the determination is negative, the method proceeds to step S233. Like S225, when the value of the column in the third node connection relation table corresponding to the connectable but unconnected relay node device reaches the threshold value, the operation of switching network path is activated.

Descriptions of a third embodiment are disclosed below. In the third embodiment, both the first relay node device 110 and the second relay node device 120 are not equipped with corresponding function for supporting the network path selection method. That is, the determination in step S207 is negative and the method proceeds to step S208.

In step S208, one of the first relay node device 110 and the second relay node device 120 is selected and connected by the processing unit 510 of the network node device 500 according to the network connection type. For example, the processing unit 510 prefers to connect to the relay node device adopting wired network connection technology.

In step S247, a third node relation table is created by the processing unit 510 of the network node device 500.

In step S249, an uplink testing signal is transmitted to the gateway 900 by the communication unit 530 of the network node device 500.

In step S251, an uplink path time from the time when the uplink testing signal is transmitted till the time when an uplink testing response signal replied by the gateway 900 in response to the uplink testing signal is received is calculated by the processing unit 510 of the network node device 500.

In step S253, an uplink time parameter is calculated by the processing unit 510 of the network node device 500 according to the uplink path time, and a third uplink time parameter table is created by the same according to the uplink time parameter.

In step S255, a downlink time parameter table is received from the gateway 900 by the communication unit 530 of the network node device 500. The communication unit 530 of the network node device 500 transmits a request signal to request the gateway 900 to provide the downlink time parameter table in response to the request signal.

In step S257, the third uplink time parameter table is updated by the processing unit 510 of the network node device 500 according to the downlink time parameter table, and the third node connection relation table is updated by the same according to the updated third uplink time parameter table and the downlink parameter table. In the present embodiment, the processing unit 510 uses an average value of the downlink time parameter of the downlink time parameter table corresponding to the network node device 500 and the uplink time parameter of the third uplink time parameter table as an updated uplink time parameter, and records the average value to the third uplink time parameter table. The processing unit 510 of the network node device 500 updates the third node connection relation table according to the downlink time parameter corresponding to the relay node device, which is connectable but is unconnected and does not provide the uplink time parameter table, among the updated third uplink time parameter table and the downlink time parameter table.

In step S259, whether to switch the network path is determined by the processing unit 510 of the network node device 500 according to the third node connection relation table and a threshold value. If the determination is positive, the method proceeds to step S261, the network node device 500 is disconnected from the currently connected relay node device but is connected to the relay node device corresponding to the column where the threshold value is reached, and the value of the column in the third node connection relation table corresponding to the disconnected relay node device is reset. If the determination is negative, the method proceeds to step S249.

Details of steps S257-S263 are similar to that of steps S241-S247, and the similarities are not repeated here.

In a fourth embodiment, both the first relay node 110 and the second relay node 120 are equipped with corresponding function for supporting the network path selection method, but the gateway 900 is not equipped with corresponding function for supporting the network path selection method. Under such circumstances, the operations of the network node device 500 in the present embodiment are identical to that in the first embodiment.

In a fifth embodiment, one of the first relay node 110 and the second relay node 120 is equipped with corresponding function for supporting the network path selection method, but the other one of the first relay node 110 and the second relay node 120 and the gateway 900 are not equipped with corresponding function for supporting the network path selection method. Under such circumstance, the network node device 500 determines to connect to the relay node device equipped with corresponding function for supporting the network path selection method.

In a sixth embodiment, none of the first relay node 110, the second relay node 120 and the gateway 900 is equipped with corresponding function for supporting the network path selection method. Under such circumstance, and the network node device 500 determines to connect to a relay node device according to the network connection type of the relay node.

It should be noted that the mesh network and the process disclosed above are for exemplary purpose only. The network path selection method of the present invention can also be used in a situation where the quantity of connectable relay node devices is more than three. Furthermore, the node connection relation table, the node connection relation master table, the uplink time parameter table and the downlink time parameter table, which are illustrated in the form of tables in the above embodiments, can also be realized in the form of matrix or other data forms in practical application. Therefore, the node connection relation table, the node connection relation master table actually represent the data recording connection relation of the nodes; the uplink time parameter table and the downlink time parameter table respectively represent the data recording uplink time parameter and downlink time parameter; and the present invention does restrict the data form.

The spirit of the present invention lies in that the network node device estimates an uplink time parameter for connecting to the gateway via a corresponding network path according to the uplink time parameter provided by a connectable relay node device, and then selects a preferred network path according to the estimated uplink time parameter. As for the relay node device, which is connectable but does not provides the uplink time parameter, the network node device checks whether better network path exists according to the downlink time parameter table provided by the gateway. Moreover, the network node device determines whether to activate the operation of switching network path according its own uplink time parameter table and node connection relation table which are periodically updated.

As disclosed above, the network node device avoids selecting the network path according to the network connection type of the connectable relay node device only. For example, when a conventional network node device determines whether to connect to a wireless relay node device or a wired relay node device, the conventional network node device still determines to connect to the wired relay node device despite that the wireless relay node device provides better connection than the wired relay node device (such as in terms of network speed). The network selection method and the network node device of the present invention can effectively avoid the above situation.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A network node device, comprising:
   a communication unit connected to a gateway via one of a first relay node device and a second relay node device; and
   a processing unit coupled to the communication unit to:
   determine whether a first uplink time parameter table is received from the first relay node device and whether a second uplink time parameter table is received from the second relay node device;
   when the first uplink time parameter table is received from the first relay node device and the second uplink time parameter table is received from the second relay node device, calculate a first estimated uplink time parameter according to the first uplink time parameter table and a second estimated uplink time parameter according to the second uplink time parameter table;
   receive the updated first uplink time parameter table or the updated second uplink time parameter table from unselected one of the first relay node device and the second relay node device; and
   determine to connect to the gateway via one of the first relay node device and the second relay node device according to the first estimated uplink time parameter and the second estimated uplink time parameter,
   wherein the first uplink time parameter table comprises a first uplink time parameter generated according to a first uplink path time from the time when the first relay node device transmits a first uplink testing signal to the gateway till the time when the first relay node device receives a first uplink testing response signal replied by the gateway in response to the first uplink testing signal,
   the second uplink time parameter table comprises a second uplink time parameter generated according to a second uplink path time from the time when the second relay node device transmits a second uplink testing signal to the gateway till the time when the second relay node device receives a second uplink testing response signal replied by the gateway in response to the second uplink testing signal.

2. The network node device according to claim 1, wherein the processing unit further:
   operates the communication unit to connect to the gateway via selected one of the first relay node device and the second relay node device;
   creates a third node connection relation table recording the connection relation between the network node device and the first relay node device and the second relay node device;
   transmits a third uplink testing signal to the gateway;
   calculates a third uplink path time from the time when the third uplink testing signal is transmitted to the gateway till the time when a third uplink testing response signal replied by the gateway in response to the third uplink testing signal is received; and
   generates a third uplink time parameter according to the third uplink path time.

3. The network node device according to claim 2, wherein the processing unit further:
   creates and update a third uplink time parameter table according to the third uplink time parameter.

4. The network node device according to claim 2, wherein the processing unit further:
   creates a third uplink time parameter table according to the first estimated uplink time parameter or the second estimated uplink time parameter corresponding to the selected one of the first relay node device and the second relay node device; and
   creates and update the third uplink time parameter table according to the third uplink time parameter.

5. The network node device according to claim 3, wherein the processing unit further:
   calculates the updated first estimated uplink time parameter or the updated second uplink time parameter respectively corresponding to the updated first uplink time parameter table or the updated second uplink time parameter table according to the updated first uplink time parameter table or the updated second uplink time parameter table;

updates the third node connection relation table according to the updated first estimated uplink time parameter or the updated second uplink time parameter and the updated third uplink time parameter table; and determines whether to activate an operation of switching the network path according to the updated third node connection relation table.

6. The network node device according to claim 4, wherein the processing unit further:

calculates the updated first estimated uplink time parameter or the updated second uplink time parameter respectively corresponding to the updated first uplink time parameter table or the updated second uplink time parameter table according to the updated first uplink time parameter table or the updated second uplink time parameter table;

updates the third node connection relation table according to the updated first estimated uplink time parameter or the updated second uplink time parameter and the updated third uplink time parameter table; and determines whether to activate an operation of switching the network path according to the updated third node connection relation table.

7. A network node device, comprising:

a communication unit connected to a gateway via one of a first relay node device and a second relay node device; and a processing unit coupled to the communication unit to:

determine whether a first uplink time parameter table is received from the first relay node device and whether a second uplink time parameter table is received from the second relay node device;

when the first uplink time parameter table is received from the first relay node device and the second uplink time parameter table is received from the second relay node device, calculate a first estimated uplink time parameter according to the first uplink time parameter table and a second estimated uplink time parameter according to the second uplink time parameter table;

determine to connect to the gateway via one of the first relay node device and the second relay node device according to the first estimated uplink time parameter and the second estimated uplink time parameter;

when the first uplink time parameter table is received from the first relay node device or the second uplink time parameter table is received from the second relay node device, operate the communication unit to connect to the gateway via first relay node device or the second relay node device respectively corresponding to the received first uplink time parameter table or the received second uplink time parameter table;

create a third node connection relation table and a third uplink time parameter table;

receive a downlink time parameter table from the gateway;

update the third node connection relation table according to the downlink time parameter table and the third uplink time parameter table; and determine whether to activate an operation of switching the network path according to the updated third node connection relation table, wherein the first uplink time parameter table comprises a first uplink time parameter generated according to a first uplink path time from the time when the first relay node device transmits a first uplink testing signal to the gateway till the time when the first relay node device receives a first uplink testing response signal replied by the gateway in response to the first uplink testing signal, the second uplink time parameter table comprises a second uplink time parameter generated according to a second uplink path time from the time when the second relay node device transmits a second uplink testing signal to the gateway till the time when the second relay node device receives a second uplink testing response signal replied by the gateway in response to the second uplink testing signal.

8. A network path selection method performed by a network node device, wherein the network path selection method comprises:

determining whether a first uplink time parameter table is received from a first relay node device and whether a second uplink time parameter table is received from a second relay node device;

when the first uplink time parameter table is received from the first relay node device and the second uplink time parameter table is received from the second relay node device, calculating a first estimated uplink time parameter according to the first uplink time parameter table and a second estimated uplink time parameter according to the second uplink time parameter table;

receiving the updated first uplink time parameter table or the updated second uplink time parameter table from unselected one of the first relay node device and the second relay node device; and determining to connect to a gateway via one of the first relay node device and the second relay node device according to the first estimated uplink time parameter and the second estimated uplink time parameter, wherein the first uplink time parameter table comprises a first uplink time parameter generated according to a first uplink path time from the time when the first relay node device transmits a first uplink testing signal to the gateway till the time when the first relay node device receives a first uplink testing response signal replied by the gateway in response to the first uplink testing signal, the second uplink time parameter table comprises a second uplink time parameter generated according to a second uplink path time from the time when the second relay node device transmits a second uplink testing signal to the gateway till the time when the second relay node device receives a second uplink testing response signal replied by the gateway in response to the second uplink testing signal.

9. The network path selection method according to claim 8, further comprising:

connecting to the gateway via selected one of the first relay node device and the second relay node device;

creating a third node connection relation table recording the connection relation between the network node device and the first relay node device and the second relay node device;

transmitting a third uplink testing signal to the gateway;

calculating a third uplink path time from the time when the third uplink testing signal is transmitted to the gateway till the time when a third uplink testing response signal replied by the gateway in response to the third uplink testing signal is received; and generating a third uplink time parameter according to the third uplink path time.

10. The network path selection method according to claim 9, further comprising:
creating and updating a third uplink time parameter table according to the third uplink time parameter.

11. The network path selection method according to claim 9, further comprising:
creating a third uplink time parameter table according to the first estimated uplink time parameter or the second estimated uplink time parameter corresponding to the selected one of the first relay node device and the second relay node device; and
creating and updating the third uplink time parameter table according to the third uplink time parameter.

12. The network path selection method according to claim 10, further comprising:
calculating the updated first estimated uplink time parameter or the updated second uplink time parameter respectively corresponding to the updated first uplink time parameter table or the updated second uplink time parameter table according to the updated first uplink time parameter table or the updated second uplink time parameter table;
updating the third node connection relation table according to the updated first estimated uplink time parameter or the updated second uplink time parameter and the updated third uplink time parameter table; and
determining whether to activate an operation of switching the network path according to the updated third node connection relation table.

13. The network path selection method according to claim 11, further comprising:
calculating the updated first estimated uplink time parameter or the updated second uplink time parameter respectively corresponding to the updated first uplink time parameter table or the updated second uplink time parameter table according to the updated first uplink time parameter table or the updated second uplink time parameter table;
updating the third node connection relation table according to the updated first estimated uplink time parameter or the updated second uplink time parameter and the updated third uplink time parameter table; and
determining whether to activate an operation of switching the network path according to the updated third node connection relation table.

14. A network path selection method performed by a network node device, wherein the network path selection method comprises:
determining whether a first uplink time parameter table is received from a first relay node device and whether a second uplink time parameter table is received from a second relay node device;
when the first uplink time parameter table is received from the first relay node device and the second uplink time parameter table is received from the second relay node device, calculating a first estimated uplink time parameter according to the first uplink time parameter table and a second estimated uplink time parameter according to the second uplink time parameter table;
determining to connect to a gateway via one of the first relay node device and the second relay node device according to the first estimated uplink time parameter and the second estimated uplink time parameter,
when the first uplink time parameter table is received from the first relay node device or the second uplink time parameter table is received from the second relay node device, connecting to the gateway via first relay node device or the second relay node device respectively corresponding to the received first uplink time parameter table or the received second uplink time parameter table;
creating a third node connection relation table and a third uplink time parameter table;
receiving a downlink time parameter table from the gateway;
updating the third node connection relation table according to the downlink time parameter table and the third uplink time parameter table; and
determining whether to activate an operation of switching the network path according to the updated third node connection relation table,
wherein the first uplink time parameter table comprises a first uplink time parameter generated according to a first uplink path time from the time when the first relay node device transmits a first uplink testing signal to the gateway till the time when the first relay node device receives a first uplink testing response signal replied by the gateway in response to the first uplink testing signal,
the second uplink time parameter table comprises a second uplink time parameter generated according to a second uplink path time from the time when the second relay node device transmits a second uplink testing signal to the gateway till the time when the second relay node device receives a second uplink testing response signal replied by the gateway in response to the second uplink testing signal.

* * * * *